United States Patent [19]

Ellis et al.

[11] Patent Number: 5,035,476
[45] Date of Patent: Jul. 30, 1991

[54] CONFOCAL LASER SCANNING TRANSMISSION MICROSCOPE

[75] Inventors: Gordon W. Ellis, Media, Pa.; Koji Ichie, Hamamatsu, Japan

[73] Assignee: Hamamatsu Photonics K.K., Hamamatsu, Japan

[21] Appl. No.: 538,526

[22] Filed: Jun. 15, 1990

[51] Int. Cl.⁵ .............................................. G02B 26/10
[52] U.S. Cl. .................................... 350/6.5; 350/6.91; 350/102; 350/507; 356/445; 250/224
[58] Field of Search ....................... 350/6.1, 6.5, 6.91, 350/102, 507, 511; 356/445; 250/224, 571

[56] References Cited

U.S. PATENT DOCUMENTS

| | | | |
|---|---|---|---|
| 3,488,104 | 1/1970 | Doherty | 350/511 |
| 3,664,751 | 5/1972 | Haas | 350/511 |
| 3,715,152 | 2/1973 | Gunter, Jr. et al. | 350/102 |
| 4,368,982 | 1/1983 | Van Arnam et al. | 356/445 |
| 4,934,779 | 6/1990 | Dunning | 350/102 |
| 4,973,115 | 11/1990 | Edwards et al. | 350/6.1 |

Primary Examiner—Paul M. Dzierzynski
Assistant Examiner—Loha Ben
Attorney, Agent, or Firm—Cushman, Darby & Cushman

[57] ABSTRACT

This invention relates to a confocal laser scanning transmission microscope including a deflecting element for deflecting a light beam at a set scanning frequency in a main scanning direction and an auxiliary scanning direction perpendicular to the main scanning direction to irradiate the light spot to a specimen, and the microscope further comprises an infinity compensating objective lens for collecting a transmitted light through the specimen to form into a parallel beam and a cube-corner-reflector disposed on the opposite side of the specimen across the objective lens and on the exit pupil position of the infinity compensating objective lens.

2 Claims, 3 Drawing Sheets

CONFOCAL LASER SCANNING TRANSMISSION MICROSCOPE

BACKGROUND OF THE INVENTION

1. Field of the Invention

This invention relates to a confocal laser scanning transmission microscope having deflecting elements for deflecting a light beam at a set frequency in a main scanning direction and an auxiliary scanning direction perpendicular to the main scanning direction to irradiate the light beam to a specimen.

2. Related Background Art

In the optical scanning transmission microscope, a light beam converged in a fine spot is deflected in two dimensions by two deflecting elements to cause the light spot to scan the surface of a specimen at high speed, and the reflected light or the transmitted light on the specimen is detected by a photodetector, such as a photomultiplier, to obtain the optical information of the specimen as electric signals (Japanese Patent Laid-Open Publication No. 121022/1986). In this conventional microscope, generation of stray light can be prevented by using a light beam converged in a fine spot to scan a specimen. Furthermore, the optical information of a specimen is provided as electric signals, and the brightness, contrast, etc. of an image can be electrically adjusted while the specimen can be observed on a monitor.

But in the conventional microscope, a number of optical components are required to form a confocal arrangement. And a drawback of this microscope is that the optical system for guiding a transmitted light again to the deflecting element is complicated, and the microscope is accordingly large-sized. The microscope includes such a number of optical components that it is difficult to adjust their alignment.

Another conventional microscope is a confocal scanning light microscope in which the beam is fixed and the specimen is scanned at high speed ("confocal scanning light microscopy with high aperture immersion lenses", Journal of Microscopy, Vol. 117, Pt 2, Nov., 1979, pp. 219 to 232).

This conventional microscope, however, was not practical in the case of a living specimen since the living thing can not safely be vibrated (scanned).

SUMMARY OF THE INVENTION

An object of this invention is to provide a confocal laser scanning transmission microscope which easily can provide an image of a transmitted light and includes a small number of optical components.

For the purpose of achieving this object, this invention provides a confocal laser scanning transmission microscope which comprises deflecting elements for deflecting a light beam at a set scanning frequency in a main scanning direction and in an auxiliary scanning direction perpendicular to the main scanning direction to irradiate the light spot to a specimen and is characterized in that the microscope further comprises an infinity compensating objective lens for collecting a beam of the transmitted light through the specimen to form into a parallel beam, and a cube-corner-reflector disposed on the opposite side of the specimen across the objective lens and on the exit pupil position of the infinity compensating objective lens.

In this invention having such structure, the light transmitted through a specimen is reflected by the cube-corner-reflector to form a spot on the same part of the specimen to return along the same optical path as the reflected and scattered light.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENT

Figure 1:
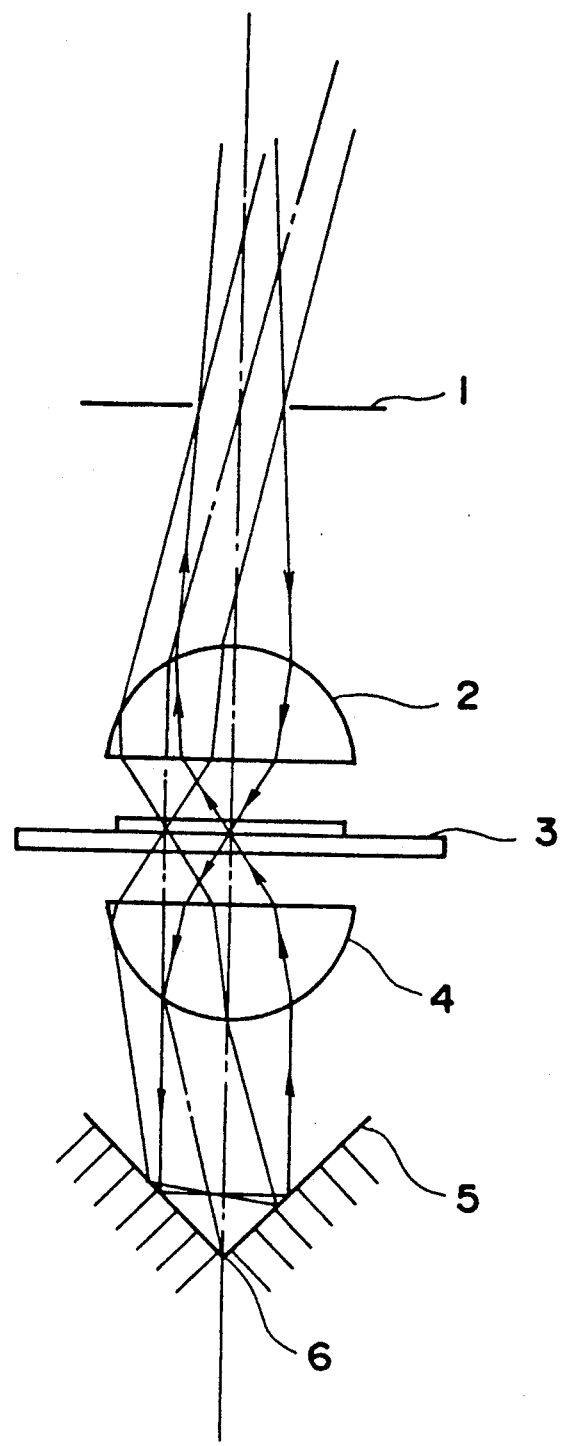
FIG. 1 is a schematic view of the optics associated with the specimen location on the confocal laser scanning transmission microscope according to one embodiment of this invention.

The confocal laser scanning transmission microscope according to one embodiment of this invention will be explained below with reference to the drawings attached hereto. One element has the same reference numeral throughout the description so as not to repeat its explanation.

FIG. 1 is a schematic view of the optics near the specimen location on the confocal laser scanning transmission microscope according to one embodiment of this invention. This confocal laser scanning transmission microscope basically comprises a light source, deflecting elements, an objective lens, and a cube-corner-reflector. A laser beam emitted from the light source and deflected by the deflecting element passes the objective lens 2 to be incident on a specimen 3. The laser beam is irradiated so as to pass the entrance pupil 1 of the objective lens 2. An infinity compensating objective lens 4 is disposed on the opposite side of the objective lens 2 across the specimen 3. Behind the infinity compensating objective lens 4 is disposed a cube-corner-reflector 5. The cube-corner-reflector 5 is disposed in the exit pupil plane 6 of the objective lens 4.

The operation of this confocal laser scanning transmission microscope will be explained. A laser beam deflected at a set scanning frequency in a main scanning direction and an auxiliary scanning direction passes the entrance pupil 1 of the objective lens 2 to be converged on the specimen by the objective lens 2. The light reflected or back-scattered by the specimen 3 returns reversely along the optical path, but the transmitted and forward-scattered or diffracted light is formed into parallel beams by lens 4 to be incident on the cube-corner-reflector 5. These parallel beams are reflected by the cube-corner-reflector 5 to form again a spot at the same position on specimen 3 and returns reversely along the same optical path of the reflected and back scattered light.

Thus, the infinity compensating objective lens 4 and the cube-corner-reflector 5 facilitate formation of an image by transmitted light. A laser beam is transmitted twice through the specimen, so that an image of sharp contrast can be formed.

Figure 2:
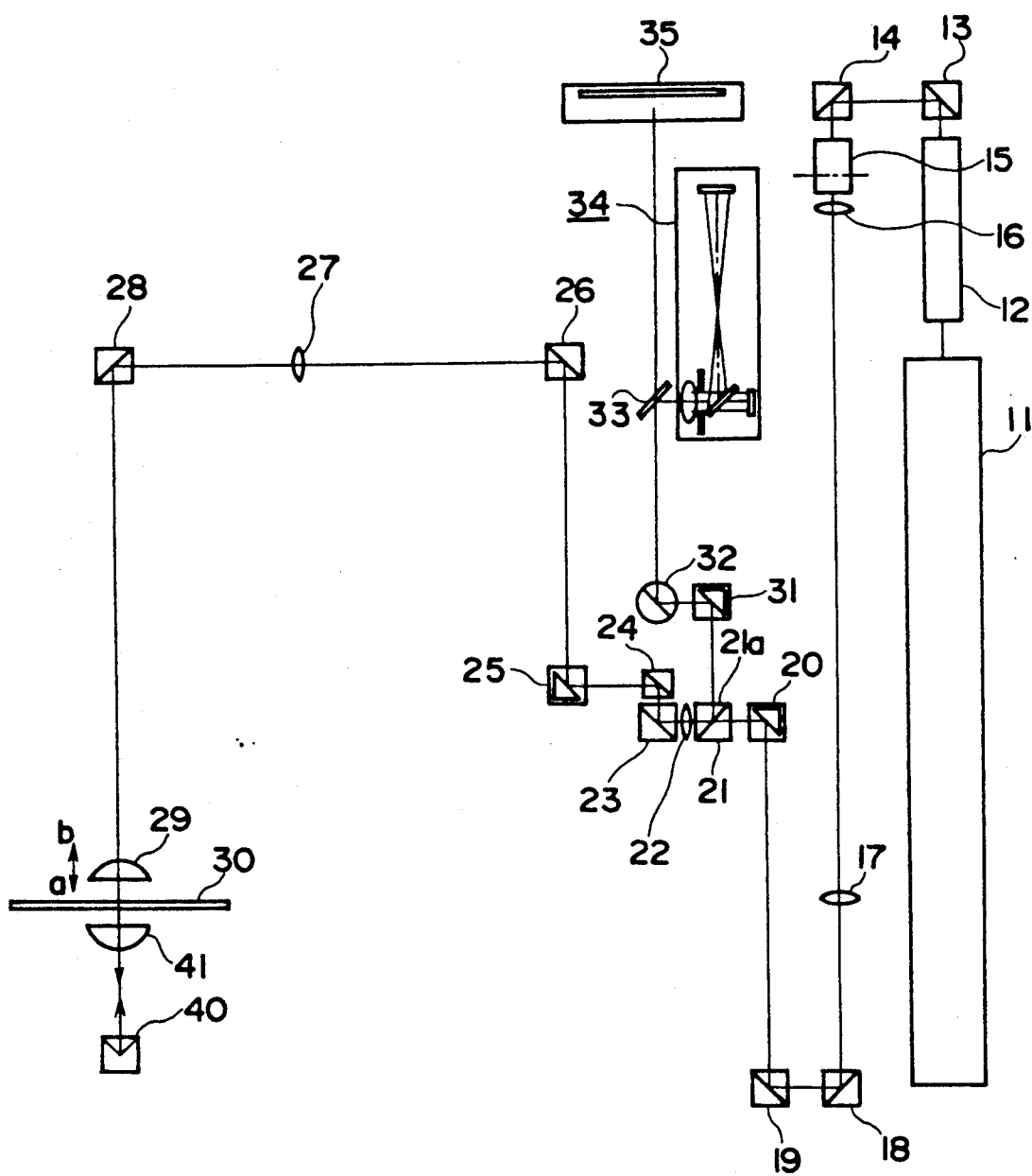
FIG. 2 is a schematic view of the confocal laser scanning transmission microscope according to one application of this invention.

Next, the confocal laser scanning transmission microscope according to one application of this invention will be explained below. FIG. 2 is a schematic view of the confocal laser scanning transmission microscope according to the application. A light beam emitted from a laser source 11 is expanded in diameter by an expander 12. The expanded beam is reflected perpendicularly by rectangular (right angle) prisms 13, 14 respectively to be incident on an acoustic optical element 15, a first deflecting element. This acoustic optical element 15 is for oscillating the light beam at a high rate. The light beam oscillated at a high rate scans the surface of a specimen at a scanning frequency f1 in the X direction (the main scanning direction). The light beam deflected by the acoustic optical element 15 is converged by a condenser lens 16 to be incident on a beam splitter 21 through a relay lens 17, and rectangular prisms 18, 19, 20. The beam splitter 21 has a half mirror surface 21a. The light beam incident on the half mirror is transmitted through the half mirror surface 21a to be incident on the relay/image-forming lens 22. The relay/image-forming lens 22 functions as a relay lens for the light beam advancing toward the specimen, while functioning also as an image-forming lens for the light beam from the specimen. The light beam outgoing from the relay/image-forming lens 22 is incident on an oscillating mirror 23, a second deflecting element (oscillating at frequency f2) to be deflected in the Y-direction (the auxiliary direction) perpendicular to the X-direction. The light beam reflected by the oscillating mirror 23 is reflected perpendicularly by the rectangular prisms 24, 25, 26 respectively. The light beam is reflected again by a rectangular prism 28 through a relay lens 27 to be converged by an objective lens 29 into a fine spot to be incident on a specimen 30. The light beam converged in the fine spot to be incident on the specimen 30 has been deflected by the acoustic optical element 15 and the oscillating mirror 23 respectively at respective frequencies in the X-direction and the Y-direction, and thus the specimen 30 can be scanned at set frequencies f1 in the X-direction and f2 the Y-direction with the fine spot of the light beam.

The operation of picturing an image of the reflected light by this confocal laser scanning transmission microscope will be explained. The reflected light from specimen 30 is converged by objective lens 29 to be incident on the oscillating mirror 23 through rectangular prism 28, the relay lens 27, and the rectangular prisms 26, 25, 24. The reflected light incident on the oscillating mirror 23 is reflected perpendicularly by the oscillating mirror 23, passes a relay/image-forming lens 22 to be reflected perpendicularly by the half mirror surface 21a of the beam splitter 21, and then is incident on a mirror 32 through a rectangular prism 31. This mirror 32 turns the light direction from the rectangular prism 31 by 90 degrees to the optical axis to change the optical path. The light beam incident on the mirror 32 is reflected perpendicularly to be incident on a beam splitter 33. This beam splitter 33 comprises a half mirror tilted by 45 degrees to the optical axis. The reflected beam on the beam splitter 33 is incident on a focal detector 34, and the transmitted light through the beam splitter 33 is converged in a fine spot to be incident on a linear image sensor 35. The linear image sensor 35 is located at an image-forming position and comprises its respective elements so arranged linearly in a direction corresponding to the X-direction of the surface of the specimen that the respective elements detect the reflected light on the specimen 30 by each line in the X-direction, whereby the reflected light on the specimen 30 is detected by the respective elements to be photoelectrically converted, and an electric charge generated on each element is read by each line at a read frequency. This linear image sensor 35 performs substantially the same function as being confocal since its elements are very small like pinholes.

The operation of picturing an image of the transmitted light by this confocal laser scanning transmission microscope will be explained. The operation of this microscope from the laser source 11 to the specimen 30 is the same as the operation of picturing an image of the reflected light, and its operation is not repeated. The infinity compensating objective lens 41 is disposed on the opposite side of the objective lens 29 across the specimen 30. In the plane of the exit pupil of the infinity compensating objective lens 41 there is disposed a cube-corner-reflector 40. The transmitted light through the specimen 30 is formed into parallel beams by the infinity compensating objective lens 41 to be reflected by the cube-corner-reflector 40. The light beam reflected by the cube-corner-reflector 40 is spotted by the infinity compensating objective lens 41 at the same position on the specimen 30 and returns reversely along the optical path as the reflected and scattered light.

Thus, incorporation of the infinity compensating objective lens and the cube-corner-reflector in a usual reflecting-type confocal laser scanning microscope can easily convert the microscope into the transmission-type confocal laser scanning microscope.

It is expected that a combination of the infinity compensating objective lens and the cube-corner-reflector with differential interference or other modes of operation can produce an advantageous effect.

Figure 3:
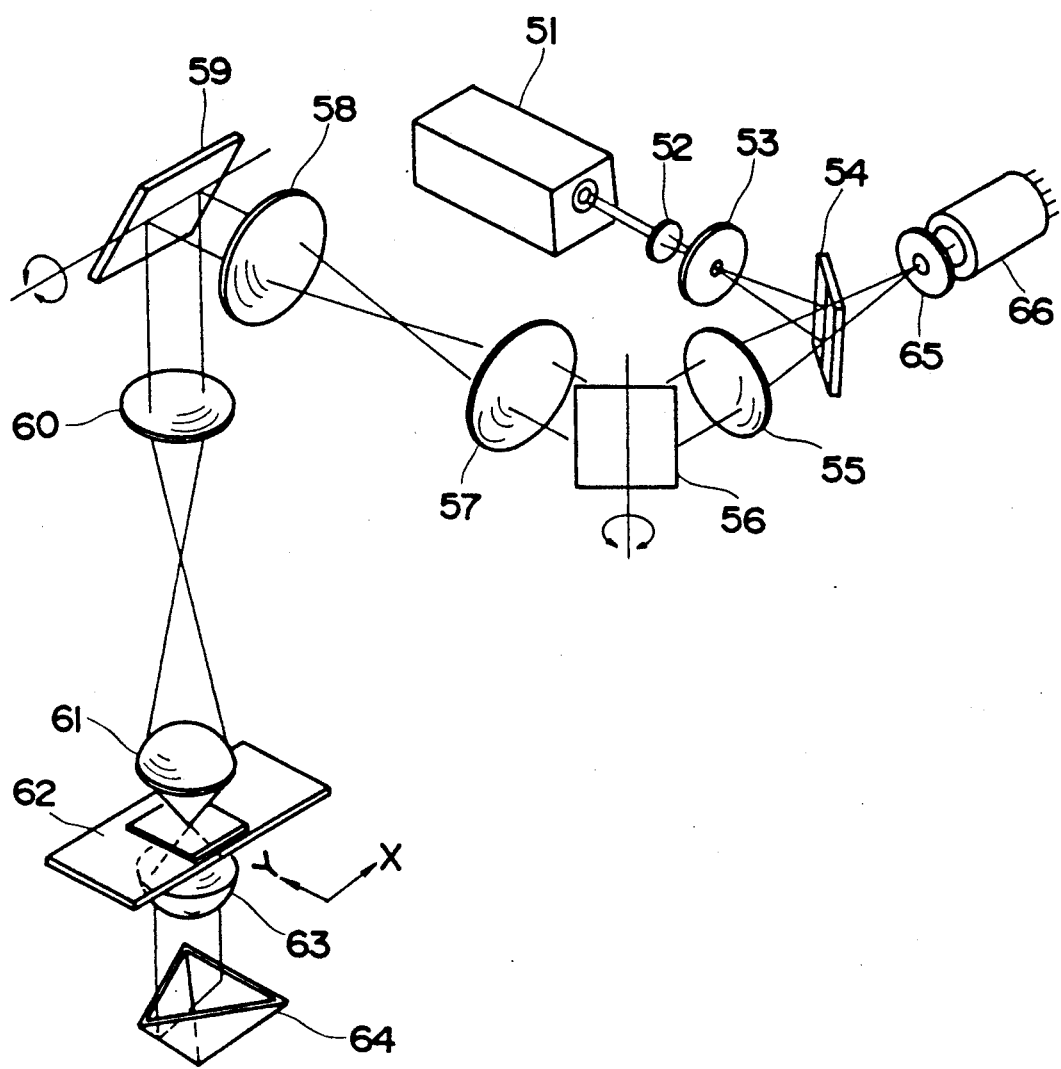
FIG. 3 is a schematic view of the confocal laser scanning microscope according to another embodiment of this invention.

FIG. 3 is a schematic view of the confocal laser scanning microscope according to another embodiment of this invention. A condenser lens 52, a pinhole member 53 and a half mirror 54 are arranged in the direction of emittance of a laser beam from a laser beam source 51. The half mirror 54 is so inclined that a laser beam from the laser beam source 51 can be reflected by 90 degrees. In the direction of travel of the reflected light, a collimator lens 55 and an X-direction light deflecting member 56 are arranged. On the light outgoing side of the X-direction light deflecting member 56, a relay lens 57, 58 and a Y-direction light deflecting member 59 are arranged substantially linearly. An image-forming lens 60, and objective lens 61 and a specimen 62 are arranged on the light outgoing side of the Y-direction light deflecting member 59. An infinity compensating objective lens 63 is disposed on the opposite side of the objective lens 61 across the specimen 62. Behind the infinity compensating objective lens 63 is disposed a cube-corner-reflector 64. The cube-corner-reflector 64 is disposed in the exit pupil plane of the objective lens 63. On the opposite side of the collimator lens 55 across the half mirror 54 are arranged a detector 66 accessed through a pinhole member 65. Further, a dichroic mirror can be used instead of the half mirror 54 and a galvanometric scanner or a rotary polygonal scanner can be used instead of the X-direction light deflecting member 56 and the Y-direction light deflecting member 59.

Next, the operation of the confocal laser scanning microscope according to the above-described embodiment will be explained below. A laser beam emitted from the laser source 51 is condensed onto the pinhole member 53 by the condenser lens 52 to form a point light source. This point light is reflected by the half mirror 54 and is incident on the collimator lens 55 to form a parallel light. This parallel light is scanned in a predetermined direction at high speed by the X-direction light deflecting member 56. This scanned light is incident on the Y-direction light deflecting member 59 through the relay lens 57, 58 to form an image from the X-direction light deflecting member 56 on the Y-direction light deflecting member 59. The direction of scanning by Y-direction light deflecting member 59 is substantially perpendicular to the direction of scanning by X-direction light deflecting member 56. The light scanned by Y-direction light deflecting member 59 is incident on the image-forming lens 60 to form a spot of light at the rear image plane of the objective lens 61. The light from this spot is in turn incident on the objective lens 61 to form a spot of light stopped to the diffraction limit at the specimen 62 for two dimensional scanning. The light transmitted through the specimen 62 is formed into parallel beams by the infinity compensating objective lens 63 to be incident on the cube-corner-reflector 64. The light incident to the cube-corner-reflector 64 is reflected in the diametrically opposite direction to the incident direction of the light and is incident on the infinity compensating objective lens 63. The light incident to the infinity compensating objective lens 63 illuminates the same position on the specimen 62 on which the light is originally incident, from the opposite direction to the incident direction, and this light is subsequently incident on the objective lens 61.

Further, the reflecting and scattering fluorescence is caught by the objective lens 61 and returned to the half mirror 54 reversely along the optical path as the light reversely illuminated by the infinity compensating objective lens 63 and the cube-corner-reflector 64. The light transmitted through the half mirror 54 is incident on the pinhole member 65 provided at a conjugate of the pinhole member 53 and is detected by the detector 66.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

We claim:

1. A confocal laser scanning transmission microscope including a deflecting element for deflecting a light beam at a set scanning frequency in a main scanning direction and an auxiliary scanning direction perpendicular to the main scanning direction to irradiate the light spot to a specimen, the microscope comprising:
   an infinity compensating objective lens for collecting a light beam transmitted through the specimen to form into a parallel beam; and a cube-corner-reflector disposed on the opposite side of the specimen across the infinity compensating objective lens and on the exit pupil position of the infinity compensating objective lens.

2. A confocal laser scanning transmission microscope according to claim 1 further comprising an objective lens disposed on the opposite side of the infinity compensating objective lens across the specimen, and the light beam irradiated to the specimen passes through the entrance pupil of this objective lens.

* * * * *